United States Patent [19]
Maki

[11] 3,930,689
[45] Jan. 6, 1976

[54] DRIVE BELT ASSEMBLY FOR SNOWMOBILES

[75] Inventor: Kenneth A. Maki, Thief River Falls, Minn.

[73] Assignee: Arctic Enterprises, Inc., Thief River Falls, Minn.

[22] Filed: May 23, 1974

[21] Appl. No.: 472,716

[52] U.S. Cl. ............................ 305/35 EB; 180/5 R
[51] Int. Cl.² ......................................... B62D 55/24
[58] Field of Search .......... 305/35 R, 35 EB, 36, 37, 305/38; 180/5 R, 6.7, 9, 9.2 R

[56] References Cited
UNITED STATES PATENTS

| | | | |
|---|---|---|---|
| 2,786,725 | 3/1957 | Thorne | 305/37 |
| 3,623,780 | 11/1971 | Kell | 305/38 |
| 3,680,926 | 8/1972 | Trapp | 305/35 EB |
| 3,758,170 | 9/1973 | Mazurek | 305/35 EB |
| 3,762,779 | 10/1973 | Russ | 305/35 EB |
| 3,790,231 | 2/1974 | Rose | 305/35 EB |
| 3,829,174 | 8/1974 | Thomas | 305/35 EB |

Primary Examiner—Philip Goodman
Assistant Examiner—John A. Carroll
Attorney, Agent, or Firm—Molinare, Allegretti, Newitt & Witcoff

[57] ABSTRACT

A drive belt assembly for snowmobiles. The assembly includes an endless drive belt, which extends substantially across the entire width of the rear portion of the snowmobile, and is longitudinally and drivably supported on the snowmobile body. First and second sets of transversely and alternately positioned and spaced drive cleats are securely mounted on the outer surface of the drive belt. Each of the cleats has a first end portion which is adjacent one of the lateral edges of the belt, and a second end portion, which is spaced inwardly from the other edge of the drive belt. Surface portions are defined on the outer surface of the track longitudinally between each of the first end portions of one set of the drive cleats, and transversely between the second end portion of each of the other set of cleats, and the other edge of the drive belt. Flexible, unitary, lugs or projections extend from the outer surface portion. The drive cleats, which are of a futigue resistant design, and the flexible projections cooperate to provide forward traction for the snowmobile, while avoiding side slippage of the snowmobile as it is driven across the snow and/or ice.

7 Claims, 6 Drawing Figures

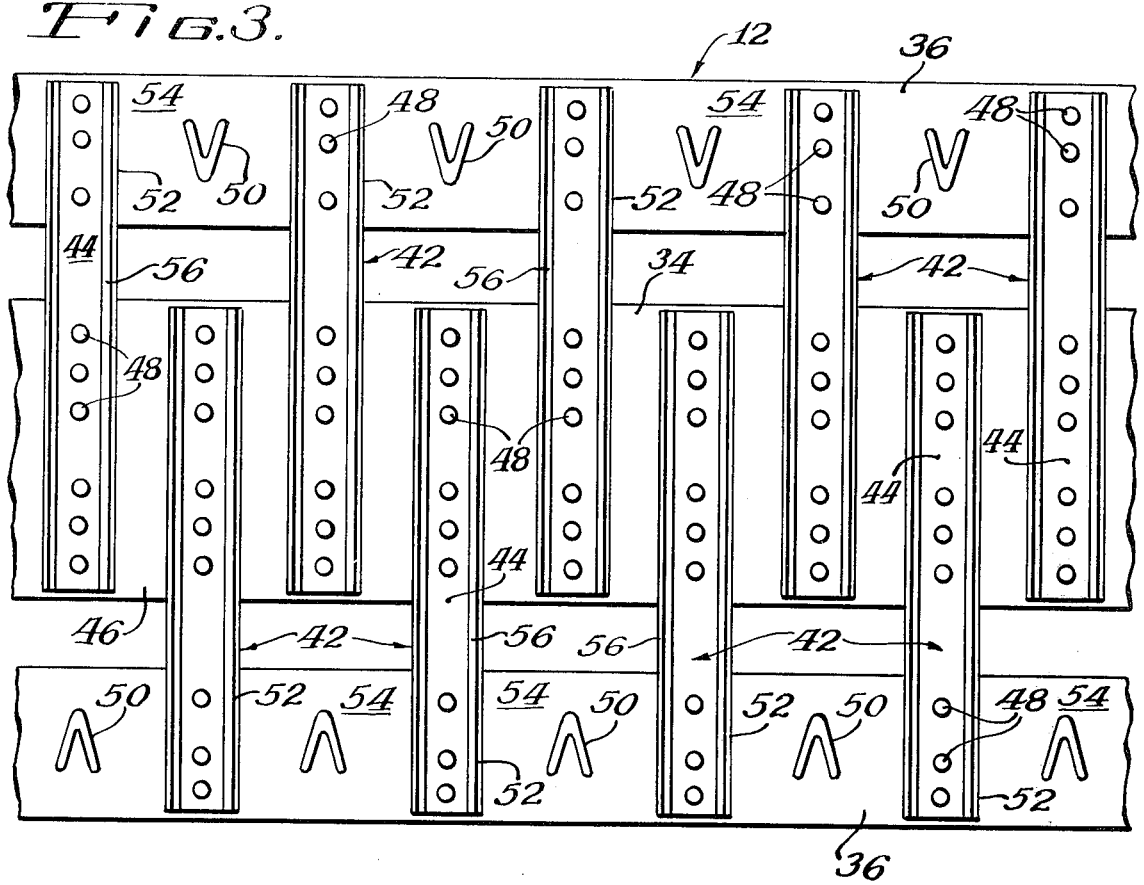
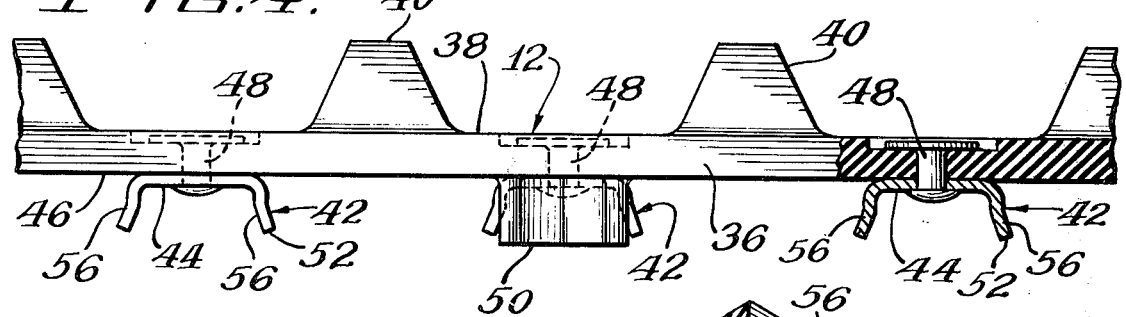
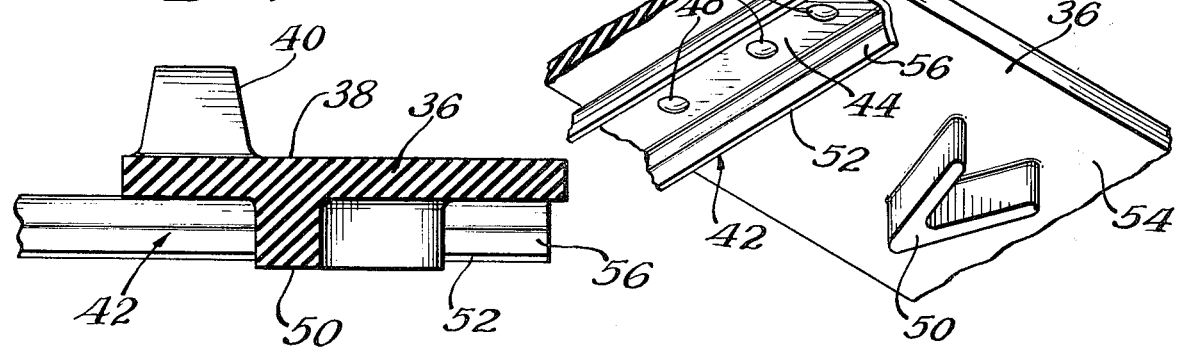

DRIVE BELT ASSEMBLY FOR SNOWMOBILES

BACKGROUND OF THE INVENTION

1. Field of the Invention

This invention relates to a drive belt assembly particularly used for operating snowmobiles, and it particularly relates to an improved drive belt assembly which is fatigue resistant, provides positive forward traction for the snowmobile, and substantially avoids side slippage of the snowmobile as it moves along icy or hard snow packed surfaces.

2. Discussion of the Prior Art

In snowy regions, snowmobiles are a conventional and important means of transportation. Snowmobiles are used extensively in snow regions, not only for everyday use, but they are also widely used for recreational and emergency purposes. Snowmobiles are operated on a wide variety of terrain. They are used in hilly or mountainous regions as well as on flat land. They are operated on fresh snow, on trails conditioned for snowmobile riding, on hard packed snow, on the icy surfaces of streams, rivers, and lakes, and on hard snow packed or icy roads.

Continuous drive belts are conventionally used for engaging the snow covered ground and/or icy surfaces, in order to provide the proper traction to propel the snowmobile forwardly. In order to provide the proper traction for use for the wide range of conditions in which snowmobiles are used, the design of the endless drive belt or drive track is extremely important. Generally speaking, the drive belt has a width substantially equal to the seat portion at the rear of the snowmobile, give or take a few inches. The drive belt is drivably suspended on the frame of the snowmobile and is generally positioned at the rear portion of the snowmobile, while a pair of steerable skis support the front end of the snowmobile.

One conventional snowmobile drive belt design is shown, for example, in Kell U.S. Pat. No. 3,623,780. Such drive belts are made of an elastomeric material. A plurality of transversely mounted and longitudinally spaced rigid elongated drive cleats are securely mounted on the outer surface of the drive belt. These drive cleats, which are conventionally U-shaped in cross-section, provide positive traction with the ground in order to propel the snowmobile in a forward direction. Although such a snowmobile track design is generally considered suitable for propelling the snowmobile forwardly, as the cleats bite into the snow and/or ice, the belt design, as shown in the Kell patent, has certain disadvantages.

One problem with the drive cleats which extend across the entire width of the belt is that, because of the nature of use of the snowmobile, the rigid, metallic cleats, as well as the drive belt, constantly undergo flexing between the opposite ends thereof, as the snowmobile travels across the snow covered ground while encountering rough terrain, rocky terrain, icy projections, etc. As a result of this flexing, the metal cleats fatigue at their central portions and ultimately many will break. Of course, broken cleats ultimately have to be replaced.

The problem of elongated "full width" cleats, that is, those extending across the entire width of the snowmobile, breaking, because of flexure, has been greatly alleviated by extending each cleat from one edge of the track only partially across the track, as about two-thirds across. These partial cleats extend alternately from opposite edges of the drive belt. Such a design is shown, for example, in Olson U.S. patent application Ser. No. 204,872, filed Dec. 6, 1971, entitled "Track Construction with partial Cleat" (assigned to the same assignee as this application), now abandoned.

Although the partial cleat track design does significantly alleviate the cleat fatigue and breaking problem created by the flexing of the drive cleats, such a track or cleat design has little or no effect on another significant problem with drive cleats of the type shown in the Kell patent. This problem is side slippage or "skating" of the rear of the snowmobile. Such slippage is particularly noticeable when the snowmobile is traveling across hard packed snow, icy surfaces, as on streams, rivers, or lakes, ice covered roads and the like. This side slippage is even more noticeable when the snowmobile is being turned. Such side slippage can be a safety problem if, for example, the operator of the snowmobile unexpectedly encounters icy areas or if an unusually sharp turn is required; basically, side slippage could, conceivably, cause the operator to lose full control over the snowmobile, possibly causing injury to the operator of the snowmobile, to those nearby, or to the snowmobile itself.

SUMMARY OF THE INVENTION

It is therefore an important object of this invention to provide a snowmobile drive belt of improved design which not only provides positive forward traction for the snowmobile, but which also greatly alleviates side slippage of the snowmobile, as is commonly encountered on icy or hard snow packed areas.

It is also an object of this invention to provide an improved drive belt for snowmobiles, wherein the drive belt utilizes a partial cleat in combination with a flexible lug or projection on the drive belt, in general alignment with the drive cleat, the cleat and projection cooperating in not only providing for forward traction for the snowmobile, but also substantially alleviating side slippage of the snowmobile.

It is a further object of this invention to provide an improved snowmobile drive belt which provides forward traction, avoids or alleviates side slippage, and is fatigue resistant and wherein the belt design is characterized by its simplicity and economy of construction and manufacture.

Further purposes and objects of this invention will appear as the specification proceeds.

The foregoing objects are accomplished by providing a drive belt assembly for snowmobiles, wherein the drive belt assembly includes an endless drive belt, which extends substantially across the entire width of the snowmobile, and is longitudinally and drivably supported on the snowmobile body, first and second longitudinally spaced and alternating sets of transversely mounted drive cleats being securely mounted on the outer surface of the drive belt, each of the cleats having a first end portion adjacent one edge of the drive belt, and a second end portion spaced inwardly from the other edge of the drive belt, outer surface portions positioned on the belt longitudinally between each pair of the first end portions of the drive cleats and transversely between the second end portion of each of the other set of drive cleats and one of the edges of the drive track, and a plurality of flexible projections or lugs projecting from the outer surface portions, the cleats and flexible projections cooperating to provide forward traction for the snowmobile, while at the same time substantially avoiding side slippage of the snowmobile.

BRIEF DESCRIPTION OF THE DRAWINGS

One particular embodiment of the present invention is illustrated in the accompanying drawings wherein:

FIG. 3 is an enlarged fragmentary plan view of the outer or traction surface of the drive belt shown in FIGS. 1 and 2;

FIG. 4 is an enlarged, fragmentary side elevational view of a portion of a portion of the drive belt, taken along the line 4—4 of FIG. 2;

FIG. 5 is an enlarged, fragmentary sectional view of the drive belt, taken along the line 5—5 of FIG. 2; and FIG. 6 is a pictorial view of my improved drive belt showing a broken portion of a rigid drive cleat and one of the flexible lugs used in combination therewith.

DETAILED DESCRIPTION OF THE PREFERRED EMBODIMENT

Figure 1:
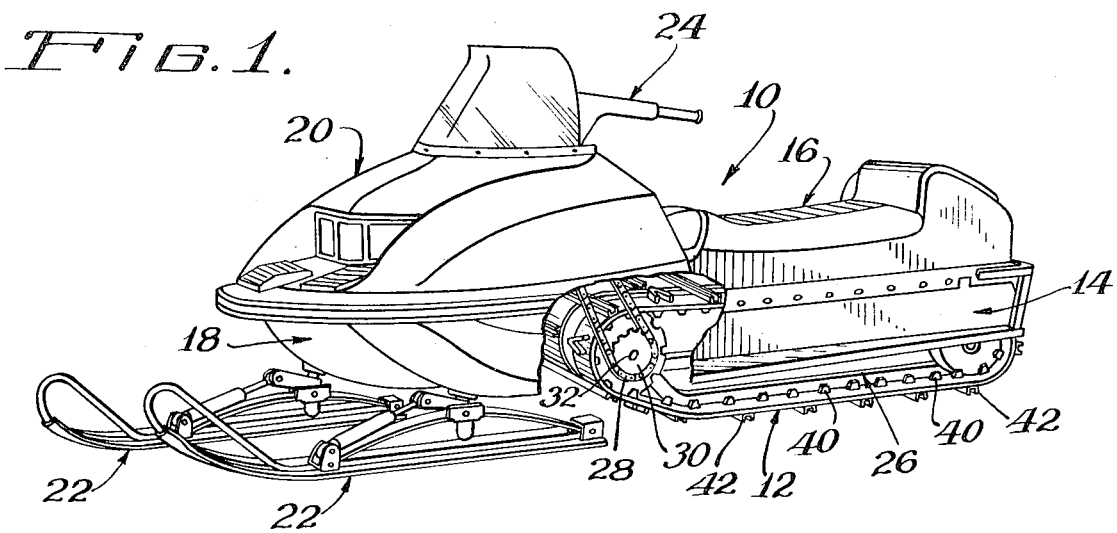
FIG. 1 is a pictorial view of a snowmobile using my improved drive belt construction.

Referring to FIG. 1, a snowmobile, generally 10, using my improved drive belt, generally 12, is shown in pictorial view. The snowmobile 10 generally includes an elongated tunnel or frame, generally 14, which has a seat assembly, generally 16, mounted on the top, rear portion thereof. A belly pan, generally 18, is conventionally secured to the frame or tunnel 14, at the forward lower portion of the snowmobile 10. A hood 20 is mounted on and over the belly pan 18. A pair of steerable front, shock mounted skis, generally 22, are mounted at the forward end of the snowmobile 10, generally below and forwardly of the belly pan 18. The skis 22 are steered by a handlebar assembly 24.

A drive belt 12 is supported by a slide rail suspension system, generally 26, of the type shown, for example, in Swenson et al. U.S. Pat. No. 3,485,312. A drive chain 28 is driven by a drive clutch assembly (not shown) mounted under the hood 20, which is operated by an internal combustion engine (not shown) also under the hood 20. The drive chain 28 engages a sprocket 30 which rotates a drive shaft 32. Sprockets (not shown) are securely mounted on the drive shaft 32 and drivably engage the inner driving surface portion of the drive belt 12 in order to drive the belt 12, and thereby the snowmobile, in a forward direction.

The foregoing description of the snowmobile 10 is intended to provide general information about the basic construction of snowmobile 10, and except for the drive belt 12, the snowmobile, as described, is generally of conventional construction.

Figure 2:
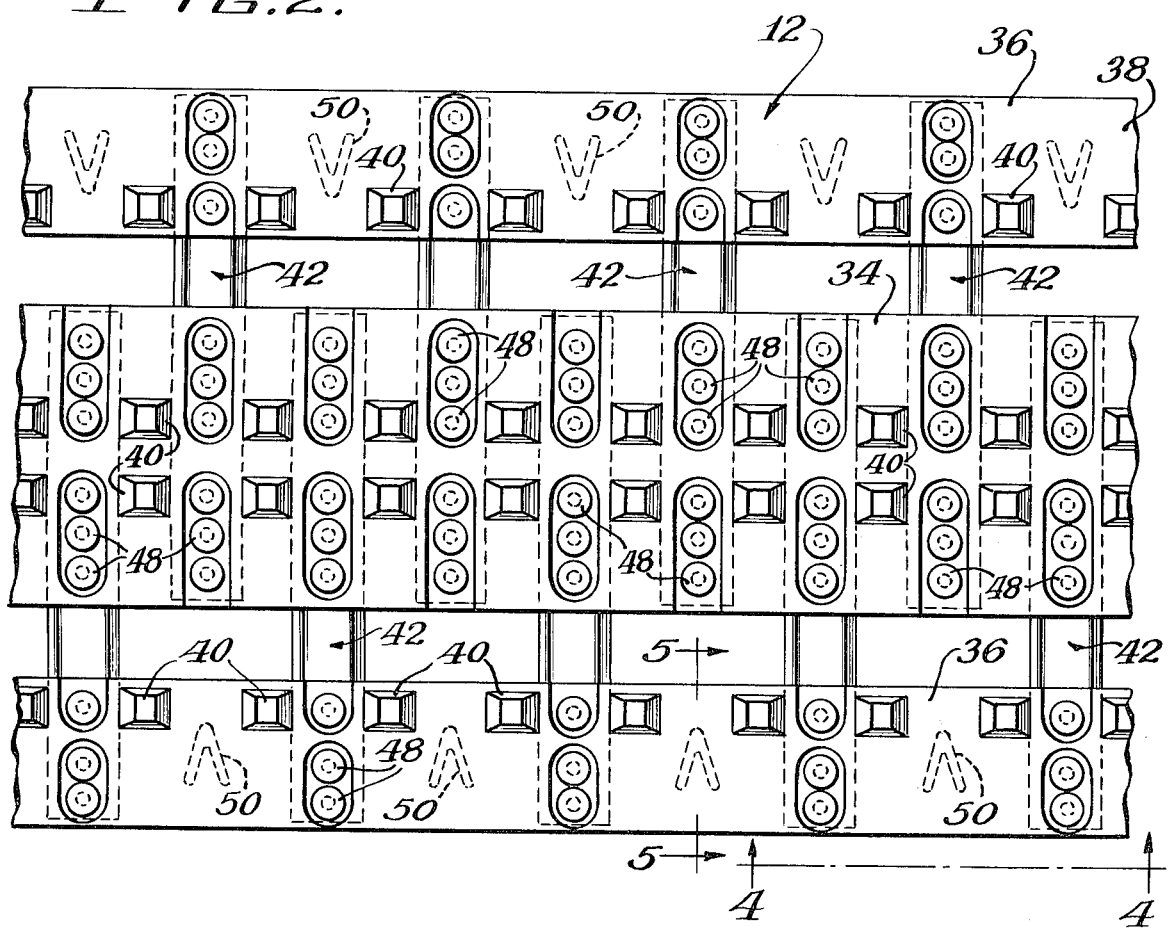
FIG. 2 is an enlarged, fragmentary plan view of the inner or driving surface of the drive belt shown in FIG. 1.

Referring to FIGS. 2 and 3, fragmentary plan view sections of the continuous drive belt 12 are shown. FIG. 2 shows the inner or driving portion of drive belt 12, while FIG. 3 shows the snow or ground engaging portion or traction portion of the drive belt 12.

Referring to FIGS. 2 and 3, the drive belt 12 includes a central continuous belt 34, and a pair of side continuous belts 36, each of which are laterally spaced from the edges of the central belt 34. The central belt 34 and the side belts 36, all of which are continuous or endless, are substantially parallel with each other and of the same length, with the central belt 34 being approximately double the width of each of the side belts 36. The belts 34 and 36 are manufactured in a generally conventional manner by the use of conventional vulcanization equipment. Desirably, a plurality of layers of elastomeric material and textile fabrics are built up, according to established procedures, to the desired dimensions and then placed in a mold to form the outer portions of the belt to the desired configuration.

Referring particularly to FIGS. 2 and 4, the driving side 38 of each of the belts 34 and 36 includes a plurality of spaced driving lugs or projections 40. The driving lugs 40 are aligned and uniformly spaced from each other in the longitudinal direction of the belts 34 and 36. One set of aligned driving lugs 40 are provided along the inner edges of each of the side belts 36 while the central belt 34 includes two aligned, central longitudinal rows of driving lugs 40. A pair of drive sprockets (not shown) are non-rotatably mounted on the drive shaft 32 and include driving teeth (not shown). Each drive sprocket engages respectively, one row of the driving lugs 40 on the side belt 36 and one row on the central belt 34 for moving the drive track or drive belt 12 in a forward direction, thereby causing the snowmobile 10 to traverse along the desired terrain. The driving lugs 40 are preferably and conventionally unitarily formed or molded with the respective belts 34 and 36.

Referring to FIG. 3, rigid cleats 42 interconnect each of the side belts 36 to the central belt 34, the side belts 36 being spaced substantially equidistantly from the central belt 34. Each drive cleat 42, preferably made of hot rolled steel, is formed in a generally U-shape, as seen best in FIG. 4. The base 44 of each cleat 42 positioned firmly against the outer face 46 of the drive belts 34 and 36. Each of the cleats 42 is positioned transverse to the longitudinal axis of the drive belt assembly 12, as best seen in FIG. 3, and each cleat 42 extends from the outer edge of one of the side belts 36, substantially across the central belt 34, and to the farthest edge of the central belt 36. Each of the cleats 42 is rigidly secured to the outer face 46 of the belts 34 and 36 by a plurality of rivets 48 or similar fasteners for securely bonding or securing the drive cleats 42 to the belt assembly 12.

As seen in FIG. 3, one set of drive cleats 42 extends transversely from the outer edge of one of the side belts 36 and partially across the drive belt assembly 12, while a second set of the drive cleats 42 are alternately spaced between the cleats 42 of the first set of cleats 42 and extend from the outer edge of the other side belt 36 and partially across the drive belt assembly 12. The cleats 42 sometimes referred to as partial or two thirds cleats, have been successfully used on drive belts of snowmobiles for alleviating the breakage problem caused by fatiguing of cleats, which extended across the entire width of the drive belt 12, such as shown in the Kell U.S. Pat. No. 3,623,780, referred to previously. A partial cleat is disclosed in the abandoned application of Olson, U.S. application Ser. No. 204,872.

As pointed out earlier, both the full width cleat and the partial width cleat had significant problems with side slippage of the snowmobile 10, as it traversed across icy terrain as on lakes or rivers, across icy roads, or across hard packed snow. The side slippage problem has been greatly alleviated by the provision of flexible projections or lugs 50 projecting upwardly from the outer face 46 of each of the side belts 36 in the space defined longitudinally between the outer end portions 52 of each set of driving cleats 42, in substantially direct longitudinal alignment with the central axis of the partial cleat 42 intermediate a pair of longitudinal outer end portions. Generally, the lugs 50 are located in the open space 54 defined between the cleats 42 on each side of the side belts 34.

As best seen in FIG. 4, in order to accomplish the desired results of alleviation of slippage, it is important for the lugs 50 to extend at least slightly above the ends of the upright legs 56 of the U-shaped drive cleats 42. Preferably, the lugs 50 are unitarily molded or formed with the side belts 36 and are made of a molded elastomeric material. The particular shape of the lugs 50, in plan view is generally V-shaped, although it is to be understood that the particular shape of the lugs 50, in plan view, forms no part of the invention. The area, in plan view, is to be sufficiently large to be effective in resisting the tendency of the snowmobile 10 to slip sideways or "ice skate" along the outer edges of the U-shaped drive cleats 42. Although the lugs 50 can be as large, in plan view, as desired, they are flexible and preferably should extend for at least about one-third of the distance between the opposite edges of the side belt 36 and at least about the width of one of the cleats 42.

From the foregoing, it is seen that the drive cleats 42 serve the dual function of interconnecting the side belts 36 with the central belt 34 with the drive belt assembly 12, while the outer ends of the upright legs 56 provide positive traction for driving the snowmobile in a longitudinal direction, as the cleats bite or dig into the snow or ice. The flexible lugs 50 cooperate with the drive cleats 42 to alleviate the tendency of the cleats 42, and thereby the snowmobile, to slip sideways as the snowmobile 10 traverses hard packed snow or icy conditions. Although the partial cleat design solved one of the problems of the full cleat of the prior art, the partial cleat did not solve the side slippage problem which is now greatly alleviated by the flexible lugs 50, which are conveniently positioned in the open surface 54, on each of the side belts 36, made possible by the provision of partial cleats.

From the above, it is seen that the drive belt assembly 12 provides a superior design resulting in positive forward traction for the snowmobile, resistance to fatigue on the cleats from flexing of the cleats, and substantial elimination or significant alleviation of side slippage as the snowmobile traverses across ice or hard packed snow.

While in the foregoing, I have provided a detailed description of one particular embodiment of my invention, it is to be understood that all equivalents obvious to those having skill in the art are to be included within the scope of my invention, as claimed.

What I claim and desire to secure by Letters Patent is:

1. A drive belt assembly for a snowmobile, said assembly comprising, in combination, an endless drive belt operatively and drivably supported on said snowmobile, first and second lateral edges defined on said drive belt, longitudinally spaced rigid metallic drive cleats securely mounted on the outer surface of said drive belt, each of said cleats extending transversely partially across said belt, each of said cleats having first and second end portions, said second end portion being spaced inwardly from said second edge, an outer surface portion defined on said belt adjacent each of said cleats between said second end portion and said second edge, and flexible upright means projecting from each of said outer surface portions, said cleats and said flexible means cooperating to provide forward traction for said snowmobiles while substantially avoiding side slippage of said snowmobile.

2. The drive belt assembly of claim 1 including first and second sets of drive cleats, each of said first end portions being adjacent said first edge, and each of said second end portions being spaced inwardly from said second edge, said second set of drive cleats being alternately mounted and longitudinally spaced on said belt, and each of said outer surface portions is defined longitudinally between two of said first end portions and transversely between said second end portion of one of said cleats and said second edge.

3. The drive belt assembly of claim 2 wherein said endless drive belt comprises first, second and third transversely spaced belt members, said first set of cleats extends substantially across only said first and second belts, and said second set of cleats extends substantially across only said second and third belts, and said outer surface portions and said flexible means are positioned only on said first and third belts.

4. The drive belt assembly of claim 1 wherein said flexible means project from said outer surface portion to a height which is at least slightly more than the height of each of said cleats.

5. The drive belt assembly of claim 1 wherein said flexible means are each unitarily formed with said drive belt.

6. The drive belt assembly of claim 1 wherein each of said flexible means is in substantially direct transverse alignment with each of said partial cleats.

7. The drive belt assembly of claim 1 wherein said flexible means are unitarily formed with said drive belt, said flexible cleats extend to a height at least slightly beyond the height of each of said cleats, and said flexible means are each in substantially direct transverse alignment with each of said cleats.

* * * * *